Feb. 8, 1938.　　　　R. B. HEARN　　　2,107,753
DISTORTION INDICATING AND MEASURING DEVICE FOR PRINTING TELEGRAPH SYSTEMS
Filed Sept. 30, 1936　　　2 Sheets-Sheet 2

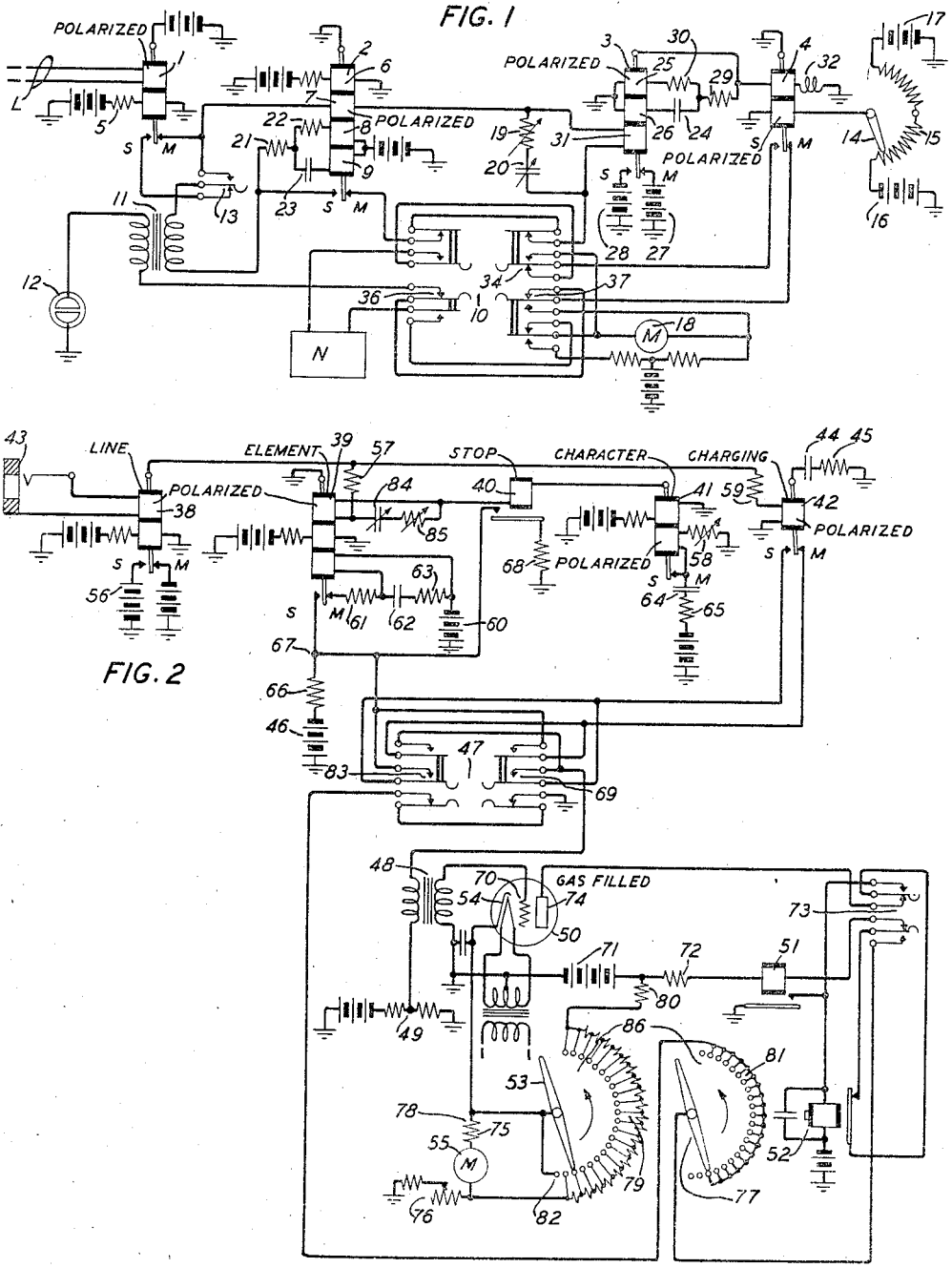

INVENTOR
R. B. HEARN
BY
ATTORNEY

Patented Feb. 8, 1938

2,107,753

UNITED STATES PATENT OFFICE 2,107,753

DISTORTION INDICATING AND MEASURING DEVICE FOR PRINTING TELEGRAPH SYSTEMS

Richard B. Hearn, Hollis, N. Y., assignor to Bell Telephone Laboratories, Incorporated, New York, N. Y., a corporation of New York Application September 30, 1936, Serial No. 103,336

8 Claims. (Cl. 178—69)

This invention relates to telegraph apparatus and more particularly to apparatus for indicating and measuring signal distortion in a teletypewriter start-stop telegraph system.

An object of the invention is to obtain a visible indication of the extent of the distortion at either end of each signal impulse of a combination. More specifically stated, this object is to obtain the maximum displacement of either end of each feed impulse and thereby determine the quality of telegraph transmission over a circuit.

An important feature of the present invention is that there is provided for a start-stop printing telegraph system, a distortion measuring circuit wherein all rotating machinery for timing is eliminated.

According to the present invention, the timing apparatus of the distortion indicator comprises relays connected in a cascade arrangement between a transmission circuit and an indicating device.

Two arrangements are shown.

In the first arrangement there are four polar relays. The transmission circuit, or loop, over which are received the signals to be measured for distortion, is connected to the primary winding of the first relay. The first relay is normally held in its marking position under the influence of the normal current of the transmission circuit. Likewise each of the other three relays are normally held in their marking position, the second and third relays being controlled by the first relay in its marking position and the fourth relay being controlled by the third relay in either marking or spacing position. In response to a combination of signal impulses of the start-stop type received from the transmission circuit, the first relay is operated by the first, or space, impulse to its spacing position, then to either its marking or spacing position depending on the character of the corresponding impulses of the next succeeding five selecting impulses and finally to the marking position in response to the last, or mark, impulse of the combination. As the first relay leaves its marking position in response to the first impulse of a combination, circuits, including the primary windings of the second and the third relays, are opened causing the second relay to operate to its spacing position under the influence of the current in its secondary, or biasing, winding and the third relay starts vibrating at twice the signal speed under the influence of the current in the two other windings connected in parallel to the relay armatures to form a vibrating circuit. The second relay is provided with two additional windings connected in parallel to form a circuit similar to a vibrating circuit to hold the relay on its spacing contact for an interval of time approximately equal to five and one-half impulses of each signal combination. As the third relay vibrates, the fourth relay operates accordingly in a circuit having an impedance sufficiently inductive to provide a very rounded wave shape. The fourth relay is provided with an additional, or biasing, winding, whereby the relay may be biased between the limits of plus or minus one hundred per cent. A suitable indicating circuit of the flashing type, such as a neon lamp, is provided on the secondary winding of a transformer, the secondary circuit of which is closed through the normal contacts of a three-way key and a contact of the fourth relay to ground. The primary circuit of the transformer is connected to ground on one side through the spacing contact of the second relay. The other side of the primary is connected to battery through a two-way key included in the primary circuit and a contact on the first relay. The operation of the circuit when undistorted signals are received is as follows: At the beginning of the start signal, the first relay operates to spacing causing the second and the third relays to operate to spacing. The second relay will stay on its spacing contact for the next five signal impulses, holding the primary windings of the second and the third relays opened. This prevents interference with the operation of the second and the third relays from the first relay when the first relay returns to marking. The third relay will vibrate at a speed of twice the signaling speed causing the fourth relay to follow it. The fourth relay is biased in either polar direction as desired. The indicating circuit can only be operated during the intervals when the fourth relay is on marking so that only the signal impulses which end while the fourth relay is on marking may be observed. However, indications may be had of incoming signal impulses of both marking and spacing character by means of a two-way key in the primary circuit of the transformer. If the two-way key in the primary circuit is in normal position, the end of the mark impulse is observed. If the two-way key in the primary circuit is operated, the ends of the space impulse is observed. The potentiometer for effecting the bias of the fourth relay is calibrated and by adjusting it until no signals are received on the indicating circuit, that is, to the point where the neon lamp ceases to flash, the amount of distortion is read directly from the calibration scale. For zero distortion, this of course, should be zero. The zero position of the potentiometer is such that relay 4 has a heavy marking bias. By using the double frequency vibrating circuit of the third relay, the operation of measuring distortion is somewhat simplified. By so doing, however, the positive and negative distortion at the end of the mark or at the end of the space impulse is combined and cannot be separated.

In order to obtain satisfactory operation, it will be necessary to have the circuit properly calibrated at all times. To accomplish this a biasing measuring circuit may be provided for checking the calibration of the potentiometer and the fourth relay. Another measuring circuit may be provided for checking the speed of the third relay. In addition to the two checks it will be desirable to check the entire circuit by sending undistorted signals from a printer in a local loop through the measuring circuit. Also, means may be provided by adjusting a resistance or a condenser connected in series in a shunt circuit across the primary winding of the third relay to shift the zero distortion point. It will probably be necessary to readjust the resistance or condenser whenever the third relay is replaced or readjusted.

In the second arrangement there are four polar relays and one neutral relay. For the purpose of identification the polar relays will be respectively referred to herein as the line, the charge, the element and the character relays. The neutral relay will be referred to as the stop relay. The winding of the charge relay is connected to the armature of the line relay in parallel with a circuit connecting in series the windings of the element, the stop and the character relays in the order mentioned, the winding of the character relay being connected in the series circuit through its own armature and contact. The transmission circuit, or loop is connected to the primary winding of the line, or first, relay. The line relay is normally held in its marking position under the influence of the normal current in the transmission circuit and in its normal position maintains each of the other relays in a marking position. In response to a combination of signal impulses of the start-stop type received from the transmission circuit, the line relay is operated in a manner similar to the first relay described above in the first arrangement. The line relay operates to its spacing position in response to the first impulse of a combination, thereby causing the three other polar relays to operate to their spacing position. The character relay in operating to its spacing contact, opens the circuit extending through its own winding, the winding of the stop and the winding of the element relay so that the operation of the line relay on subsequent impulses of a combination do not affect these relays. The charge relay, however, follows each operation of the line relay. When the winding of the stop relay which is of the neutral type is opened, the engagement between the relay armature and the contact is broken disconnecting the potentiometer which applies a stop compensating voltage to the condenser during the stop portion of the signal. A three-position mark-space key is provided to measure the distortion at the end of the mark or at the end of the space impulses as required. This key may be operated to either its mark or its space position and in either position connects a source of potential supply over the corresponding mark or space contact on the charge relay to a condenser. The charge relay is provided for charging the condenser during each unit length, or dot, impulse which in turn operates a peak voltmeter or some other suitable indicating device if the duration of the charge is longer or shorter than the time of a perfect dot length. The length of a character or signal combination is timed by the character relay, the element relay effecting a discharge of the condenser in the middle of each dot impulse. The stop relay returns to its marking or normal position at the end of the fifth selecting impulse of each combination, and thereby connects ground through a resistance to the condenser charging circuit so that the charge on the condenser during the stop period will be equivalent to the charge for a perfect dot impulse.

The indicating apparatus which serves to operate a suitable voltmeter comprises a second transformer, the primary winding of which is connected in series to the contacts of the mark-space key. The secondary winding of the transformer is connected in the input circuit of a gas-filled tube. The plate circuit of the tube includes the winding of a relay which operates in response to each plate current impulse thereby effecting the corresponding operation of a magnet which is provided for stepping a selector switch. The selector switch is arranged to operate one step over a bank of contacts each time the tube breaks down whereby section after section of an indicating potentiometer may be added to the cathode circuit of the gas-filled tube, the successive stops causing the cathode to become more and more positive with respect to its associated grid until the inputs to the grid no longer cause a breakdown in the tube. The indicating potentiometer is calibrated in per cent distortion, and therefore percentage distortion is read directly from a calibrated scale. When the selector ceases its stepping operation, the maximum distortion present in the signal impulses is indicated on a meter. The stepping switch is provided with a second bank of contacts for restoring the switch to normal whenever desired.

The circuits of the invention are schematically illustrated by the accompanying drawings in which:

Fig. 1 shows one arrangement of the invention wherein distortion is measured by the manual setting of a potentiometer arm in accordance with the zero response of a neon lamp signal, which is actuated by a relay circuit;

Fig. 2 shows another arrangement of the invention wherein distortion is measured on a meter the indications of which are in accordance with the setting of a potentiometer arm actuated by a stepping magnet which responds to the discharge of a gas-filled ionic tube;

Fig. 3 represents, by a straight line diagram, the comparative duration of each of the elements of a start-stop telegraphic character and the associated start and stop impulses;

Fig. 3A represents the operation of the line relay of Fig. 1, hereinafter known as relay 1, when responding to a start-stop telegraphic code consisting of start and stop elements and character elements consisting of a mark-space-mark-space-mark combination;

Fig. 3B illustrates the functioning, simultaneous with that of the aforesaid relay 1 of a relay, hereinafter known as relay 2;

Fig. 3C illustrates the functioning simultaneous with that of the aforesaid relay 1, of a relay hereinafter known as relay 3, which responds at twice the frequency of relay 1;

Fig. 3D indicates the sinusoidal current wave delivered by the aforesaid relay 3 to the operating winding of a relay hereinafter known as relay 4;

Fig. 3E represents the action of said relay 4 when biased as designated by "A" in Fig. 3D;

Fig. 3F represents the action of said relay 4 when biased as designated by "B" in Fig. 3D.

Referring to Fig. 1, there are shown four relays, numbered respectively 1, 2, 3, and 4. Relay 1 is the line relay and responds to the incoming start-stop telegraphic impulses. Relay 2 responds to the operation of relay 1 and is timed to remain on its spacing contacts for a time equivalent to approximately five and one-half signal elements, of which five elements the usual start-stop code is composed. Relay 3 also responds to the operation of relay 1. During the time that relay 2 is on its spacing contacts relay 3 is connected in a vibrating circuit which causes it to operate at a frequency which is twice that of relay 1, when responding to the incoming start-stop impulses. Relay 4 responds in synchronism with relay 3, and the secondary winding of transformer 11 in series with a neon lamp 12, is connected in a closed circuit from ground to ground, when the armature of relay 4 is on its marking contacts. When key 13 is operated downward, as shown in the drawings, the primary winding of transformer 11 is connected in series with the spacing contacts of the line relay 1 and when operated upward it is connected in series with its marking contacts. With this arrangement a current is induced in the secondary winding of transformer 11, causing the lamp 12 to glow, whenever the armature of relay 1 makes its spacing or marking contacts, while the secondary circuit is closed through spacing or marking contacts of relay 4. In association with relay 4 is provided a potentiometer biasing arrangement consisting of a brush arm 14 which makes sliding contact with the resistance 15, at one end of which is connected negative pole of battery 16 and at the other end positive pole of battery 17. By moving arm 14 in the direction of battery 17 or 16, relay 4 is given, through its lower winding, either a positive or negative bias. At a certain point, when measuring distortion the bias setting due to the potentiometer is such that lamp 12 fails to glow. By associating with arm 14 a properly calibrated scale, the amount of distortion may be indicated by the position of the arm 14 which effects the aforesaid zero response of lamp 12.

In order that the arrangement of Fig. 1 may function satisfactorily it is necessary that it be properly calibrated at all times. To facilitate this calibration a two-way key 10 may be connected as shown. By throwing the lever of key 10 to the left a network N is connected in series with a meter 18 which when suitably calibrated indicates the speed of relay 4. When the said key lever is operated to the right, meter 18 by suitable calibration may be arranged to measure distortion and check the calibration of the potentiometer before mentioned. In addition to these two checks it is desirable before using the circuit on a working telegraph line, to check the entire circuit by sending undistorted signals from a teletypewriter in a local loop through the line winding of relay 1. In order to shift the point of zero distortion, the lowermost winding of relay 3 is bridged by a series circuit consisting of variable resistance 19 and variable condenser 20, which, before making any tests, should be adjusted so that, when undistorted signals are being received and relay 4 is biased for zero distortion lamp 12 does not glow. A more complete understanding of the arrangement of Fig. 1 may be obtained from the following detailed description.

Let it be assumed that relay 1 is connected through its upper winding to a printing telegraph line L and that the duration of the character elements and the start and the stop elements being transmitted is represented to scale by the straight line diagram of Fig. 3. Also by assumption, after the initial spacing start impulse a character composed of mark, space, mark, space and mark impulses, in the order named is transmitted, followed by a marking stop impulse. This is diagrammatically represented by Fig. 3A, which also serves to illustrate the functioning of line relay 1, which is normally operated to its marking contacts. When relay 1 is operated to its spacing contacts on the initial spacing start impulse, which is represented by 3A1, relays 2 and 3 are operated from their normally closed marking contacts to their spacing contacts, due to the opening of the normally closed circuit traced from battery through the marking contacts of relay 1, winding 7 of relay 2, lowermost winding 31 of relay 3, uppermost normally closed contacts of key 10, and marking contacts of relay 2 to ground. Relay 2 operates to its spacing contacts due to current through the winding 6, and closes a circuit which is traced from battery through winding 8, resistances 22 and 21 and spacing contacts of relay 2 to ground. This current in winding 8 opposes the current in winding 6 and tends to operate relay 2 back to its marking contacts. However, there is also a momentary flow of current from battery through winding 9, condenser 23, resistance 21 and spacing contacts of relay 2 to ground, which current opposes the current in winding 8 and with the assistance of the current in winding 6 holds the armature of relay 2 on its spacing contacts. After an interval equivalent to the time required for the transmission of approximately five and one-half elements of a character, condenser 23 is completely charged and then the current in winding 9 approaches zero. The magnetic effect of winding 8 now predominates over that of winding 6 and relay 2 breaks its spacing contacts, disconnecting ground from the circuit of windings 8 and 9. Condenser 23 now immediately discharges in a local circuit including windings 8 and 9 in series, the current being so directed as to operate the armature of relay 2 to its marking contacts, in opposition to the effect of the current in winding 6. The transmission of the five elements of the character shown by Fig. 3A is completed, when the marking contacts of relay 2 are closed and the marking stop pulse 3A2 is effective, causing relay 1 to be operated to its marking contacts closing again the original circuit through winding 7 of relay 2 which is now held on its marking contacts in opposition to the effect of the current in winding 6.

When the circuit through the winding 31 of relay 3 was opened as before described, the relay began to operate in a vibrating circuit the constants of which are so determined that the frequency of operation is double that of the speed of transmission. This is illustrated by Fig. 3C. When the armature of relay 3 leaves its marking contacts, condenser 24 discharges in a local circuit including windings 25 and 26 so as to accelerate the movement of the armature toward the spacing contacts to which negative battery 28 is connected. When the spacing contacts are closed a circuit is completed from battery 28, through resistances 29 and 30 and winding 25 to ground and through resistance 29, condenser 24 and winding 26 to ground. The current through winding 25 is so directed as to operate the armature of relay 3 towards its marking contacts, and the momentary charging current through winding 26 is so directed as to operate said armature towards its spacing contacts. When condenser 24 is charged, the current in winding 25 predominates and the armature breaks contacts with negative battery 28. Condenser 24 now discharges in the local circuit of windings 25 and 26 and operates the armature of relay 3 to its marking contacts. The cycle of operation just described is then repeated and continues until the circuit through winding 31 is reestablished when relay 2 reoperates to its marking contacts as represented at the point 3B1 of Fig. 3B.

In operating, relay 3 transmits through the upper winding of relay 4 and inductance 32 positive and negative current, which causes relay 4 to operate alternately to its marking and spacing contacts. Due to the inductance 32 the current wave through the upper winding of relay 4 is rounded so as to be of sinusoidal shape as illustrated in Fig. 3D. Let it be assumed now that key 13 is operated to its lower contacts as shown in the drawings. Neon lamp 12 is connected in a circuit from ground through lamp 12, secondary, or left, winding of transformer 11, contacts 36 and 37 of key 10 to ground through marking contacts of relay 4. The primary, or right, winding of transformer 11 is connected in a circuit from battery on spacing contacts of relay 1, through lower contacts of key 13, right winding of transformer 11 to ground on the operated spacing contacts of relay 2, which as before described, is held operated while the five elements of the character are being transmitted. In order that lamp 12 should flash, the marking contacts of relay 4 must be closed at the same time that the spacing contacts of relay 1, either make or break. It follows, therefore, that the condition under which lamp 12 just fails to flash is when the spacing portions of the current waves shown by Fig. 3E or Fig. 3F are just broad enough to include all transitions shown in Fig. 3A. The shape of the waves shown by Figs. 3E and 3F is controlled by the position of the potentiometer arm 14, whereby relay 4 may be given a positive or negative bias through its lower winding. As hereinbefore stated, arm 14 may be arranged to cooperate with a calibrated scale upon which the distortion may be conveniently indicated in percentage. Arm 14 is accordingly now moved upward until a point is reached at which lamp 12 just ceases to glow which is the point for which the spacing contacts of relay 1 close just before the spacing contacts of relay 4 close. In practice one reading will generally be found greater than the other. Under this condition lamp 12 does not glow since its circuit through the secondary winding of transformer 11 is open at the instant when it might receive an inductive discharge from the opening and closing of the circuit of the primary winding of transformer 11. For zero distortion, arm 14 would be placed at the lower point, and the spacing contacts of relay 4 would be closed at the same time that the spacing contacts of relay 1 open or close.

The discussion hereinbefore given described the method of measuring the distortion on the spacing contacts of relay 1. To measure the distortion on the marking contacts of relay 1, key 13 is now operated upward, and a circuit is closed from ground through lamp 12, left winding of transformer 11, contacts 36 and 37 of key 10, and marking contacts of relay 4 to ground. Another circuit is closed from battery through the marking contacts of relay 1, upper contacts of key 13, right winding of transformer 11 to ground on the operated spacing contacts of relay 2. Potentiometer arm 14 should now be adjusted, as before, for the position at which lamp 12 just ceases to flash. The percentage distortion is then indicated by the position of the arm 14.

Referring now to another arrangement of the invention disclosed in Fig. 2, relay 38 is the line relay which responds to telegraphic impulses from the line, not shown, which should be plugged into jack 43. When the line relay operates to its spacing contacts, at the beginning of the transmission of a character, it opens the circuit through windings of relays 39, 40, 41 and 42, which may be referred to as the element, stop, character and charge relays, respectively. Relays 39, 41 and 42 operate to their spacing contacts. The element relay 39 is arranged so that, after current through its upper winding is stopped, it operates in a vibrating circuit and measures off intervals corresponding to perfect mark and space units. This action continues until relay 41, which remains operated during the time required for the transmission of a character, recloses the circuit through its winding. Condenser 44, which is connected to ground through a high resistance 45, is charged by the contacts of relay 42 from battery 46, through the contacts of mark-space key 47, which is operated to the right to measure mark and to the left to measure space distortion. When key 47 is operated to the right, the marking contacts of relay 42 charge condenser 44, and the spacing contacts discharge it through the left winding of transformer 48, which winding is connected to a potentiometer 49. When key 47 is operated to the left, the spacing contacts of relay 42 charge, and the marking contacts discharge condenser 44. Potentiometer 49 is adjusted so that the potential of the point to which the winding of transformer 48 is connected is equal to that of the charge received by condenser 44 when there is zero distortion. Relay 39, as before stated, operates so as to measure off perfect dot intervals, and at the center of each interval of the incoming signal it operates and discharges condenser 44. When the distortion is not zero, condenser 44 is charged to a potential either greater or less than that of potentiometer 49. Under this condition the equalizing current through the left winding of transformer 48, causes the gas-filled tube 50 to discharge and thereby operate relay 51, which causes selector switch 86 to step in the direction indicated by the arrows. After each step tube 50 is deionized due to the opening of its plate circuit by the break contacts of stepping magnet 52. This stepping continues until brush arm 53 raises the potential of the cathode element 54 of tube 50 to such a point that tube 50 no longer discharges. Meter 55 then indicates the per cent distortion. A more complete understanding of the invention may be obtained from the following detailed description.

Let it be assumed that the circuit through the upper winding of line relay 38 is opened due to an initial spacing start impulse as shown by the depression 3A1 in the curve of Fig. 3A. Relay 38 operates to its spacing contacts due to the biasing action of the current in its lower winding and closes a circuit from battery 56 through the spacing contacts of relay 38, resistance 57, uppermost winding of element relay 39, winding of stop relay 40, contacts and lower winding of character relay 41, and variable resistance 58 to ground. The normal current through the lower winding of relay 41 is accordingly reversed, in opposition to the current through the upper winding which normally tends to hold the relay operated. Relay 41 because of the reversal of current in its lower winding, breaks its contacts. This opens the circuit through the upper winding of relay 39, and after an interval equal to one-half of a dot length which interval may be obtained by adjusting condenser 84 and resistance 85, relay 39 operates to its spacing contacts due to the current in its lowermost winding, which magnetically opposes the current in its middle winding, the latter current tending to operate relay 39 to its marking contacts. The circuit through the lowermost winding of relay 39 is traced from battery 60 through said winding, resistance 61 to ground through its marking contacts. Condenser 62 is normally charged through resistance 63, and when the marking contacts of relay 39 break, condenser 62 discharges through the lowermost winding of relay 39 in such a direction as to operate relay 39 to its spacing contacts. After a short interval relay 39 reoperates to its marking contacts under the influence of its middle winding. Resistance 63 and condenser 62 are so determined that relay 39 after an interval required to charge condenser 62 reoperates to its spacing contacts. This interval is equal to that of a standard dot unit of time. This action continues until the circuit through the uppermost winding of relay 39 is closed again, after the reoperation of character relay 41 as hereafter described.

When the current through the lower winding of character relay 41 is reversed by the connection of battery 56, as before described, the normal charge on condenser 64 is reversed and when the contacts of relay 41 open there is a discharge of condenser 64 through the lower winding of relay 41 in a direction to hold the contacts of relay 41 open. On the completion of the discharge, relay 41 recloses its contacts. Resistance 58 and condenser 64 are so evaluated that the contacts of relay 41 remain open for a period equivalent to the time required to transmit approximately five and one-half elements of a standard character.

Let it be assumed now that key 47 is operated to the right in order that mark distortion may be measured. When relay 38 functioned, as before described, the direction of current flow through the winding of charge relay 42 was reversed and this relay operated to its spacing contacts. Relay 42 follows the pulsations of line relay 38. When relay 42 is normally operated to its marking contacts condenser 44 is charged in a circuit from ground, through resistance 45, condenser 44, marking contacts of relay 42, uppermost right contacts of key 47 to junction point 67, at which point there is a potential due to the flow of current from battery 46, through resistance 66, operated contacts of stop relay 40, and resistance 68 to ground. This potential is adjusted so that the charge on condenser 44 is equivalent to that obtained from battery 46, through resistance 66, when relay 42 is functioning in a distortionless circuit, as would be the case approximately if a local teletypewriter loop were plugged into jack 43.

At the beginning of the initial spacing impulse when relay 42 operates to its spacing contacts condenser 44 is connected by spacing contacts of relay 42 through contacts 69 of key 47 to the left winding of transformer 48. Since the normal potential of condenser 44, as before stated, is equal to that for distortionless operation, which voltage is that of potentiometer 49, there will be no discharge from condenser 44. At a period equal to one-half of a standard dot period, following the beginning of the initial spacing period, relay 39 operates to its spacing contacts and after a short interval reoperates to its marking contacts. As before described, it continues to operate at the middle of each standard dot interval until the transmission of the character is complete. After the initial spacing impulse, let it be assumed that relay 42 operates to its marking contacts. Condenser 44 then begins to charge from battery 46, through resistance 66, right operated contacts of key 47, and marking contacts of relay 42. After a time interval equal to a perfect dot interval, after its initial operation, relay 39 returns to its spacing contacts, connecting ground to condenser 44 discharging it. After a short interval relay 39 returns to its marking contacts removing said ground. Condenser 44 now begins to charge again, and at the end of the marking impulse is connected by the spacing contacts of relay 42 through contacts 69 of key 47 to the left winding of transformer 48 which is connected to potentiometer 49 as shown. If the potential of the charge accumulated on condenser 44 is greater or less than that of potentiometer 49, which potential is equivalent to that which would be obtained by condenser 44 in a distortionless circuit, then there is a momentary flow of current through the left winding of transformer 48, which induces a potential in the right winding, which is proportional to the difference of voltage between condenser and potentiometer. This potential is applied to the grid element 70 of gas-filled tube 50 which discharges, relay 51 operating in a circuit which may be traced from ground through plate battery 71, resistance 72, winding of relay 51, lower break contacts of reset key 73, contacts of stepping magnet 52, upper break contacts of key 73, plate element 74, through tube 50 to cathode element 54, through resistance 75, meter 55 and adjustable resistance 76 to ground. Relay 51 in operating closes an obvious circuit through the winding of stepping magnet 52, which is energized, and opens the plate circuit just traced. Tube 50 is now deionized, relay 51 releases, and brush arms 53 and 77 are advanced one step when magnet 52 is deenergized.

On the next marking impulse, condenser 44 is again charged and subsequently discharged, in the same manner as before described. Brush arms 53 and 77 are again stepped forward one step. Each step taken by brush arm 53, raises the potential of point 78 to which cathode element 54 is connected, until the potential of said cathode element 54 is sufficiently positive to prevent any further discharge of tube 50. When this point is reached the current flow from ground through resistance 76, meter 55, resistance 75, brush arm 53, resistance 79 and 80 and battery 71, causes meter 55 to indicate on its calibrated scale per cent distortion. The selector switch is now restored to normal by operating the reset key 73, when the mark-space key 47 is in its normal position. A circuit is then closed from ground through lowermost contacts of key 47 through switch contacts 81 to the point of contact of brush arm 77 through lower make contacts of key 73, break contacts of magnet 52, upper make contacts of key 73, through winding of magnet 52 to grounded battery. The switch now steps in the direction of the arrows until brush arm 77 reaches an open contact. Brush arm 53 should then be on open contact 82.

In order to measure space distortion, key 47 should be operated to the left. The spacing contacts of relay 42 then connect condenser 44 through operated contacts 83 and resistance 66 to charging battery 46. At the end of the spacing interval, the marking contacts of relay 42 are closed and then condenser 44 is connected, through the left uppermost operated contacts of key 47 to the left winding of transformer 48 and the invention then functions as before described in connection with the measurement of marking distortion.

What is claimed is:

1. A signal distortion indicator comprising a source of marking and spacing signaling impulses transmitted in combinations of the start-stop type, an electromagnetic relay responsive to the signaling impulses from said source, a plurality of other electromagnetic relays normally controlled by the first-mentioned electromagnetic relay and arranged when a combination of signaling impulses is being received from said source, to operate to a plurality of positions independently of the first-mentioned relay while said first-mentioned relay responds to the selecting impulses of each signal combination to produce unit, or dot, impulses of a definite standard and a transformer whereby said unit length selecting impulses of the signal combinations received from said source may be compared with the impulses of a definite standard to indicate the presence of distortion in the impulses received from said source.

2. A signal distortion indicator comprising a source of marking and spacing signaling impulses transmitted in combinations of the start-stop type, an electromagnetic relay responsive to the signaling impulses from said source, a plurality of other electromagnetic relays normally controlled by the first-mentioned electromagnetic relay and controlled independently of the first-mentioned relay while said first-mentioned relay responds to the selecting impulses of each signal combination, one of said plurality of relays being arranged to remain stationary and another of said plurality of relays being arranged to vibrate while the selecting impulses of each signal combination are being received by the first-mentioned relay, a second vibrating relay responsive to said other of said plurality of relays, an output circuit for said first-mentioned relay, an output circuit for said second vibrating relay arranged to intermittently close at predetermined uniform intervals, a transformer inductively connecting said output circuits whenever distortion is present in the signaling impulses received from said source, a gaseous discharge tube in said second-mentioned output circuit for indicating the presence of distortion in the signal impulses received from said source and switching means in both of said output circuits for determining whether the distortion is in the marking or spacing impulses.

3. A signal distortion indicator, according to claim 2, wherein the second vibrating relay comprises a biasing circuit including a potentiometer for predetermining the closures at uniform intervals in the second-mentioned output circuit and measuring the amount of distortion indicated by said gaseous discharge tube.

4. A signal distortion indicator comprising a source of marking and spacing signaling impulses transmitted in combinations of the start-stop type, an electromagnetic relay responsive to the signaling impulses from said source, a plurality of other electromagnetic relays normally controlled by the first-mentioned electromagnetic relay and controlled independently of the first-mentioned relay while said first-mentioned relay responds to the selecting impulses of each signal combination, one of said plurality of relays being arranged to remain stationary and the other of said plurality of relays being arranged to vibrate while the selecting impulses of each signal combination are being received by the first-mentioned relay, a charging electromagnetic relay responsive to each of the operations of said first-mentioned relay, a circuit controlled by said charging relay comprising a storing element and two parallel paths, a source of potential in engageable relation with either of said paths, a transformer, and a point of predetermined potential in engageable relation with either of said paths, switching means in said paths for connecting either one or the other of said paths to said source of potential or to said transformer and point of predetermined potential, and means connected to said transformer for comparing the difference between the potential stored on said element and the potential at said point to measure the distortion in either the marking or spacing impulses received from said source of transmitted signals.

5. A signal distortion indicator according to claim 4 wherein said comparing means comprise a gaseous discharge tube, a stepping selector switch, a distortion indicator device and a reset key for restoring said selector switch to normal.

6. A signal distortion indicator comprising a source of start-stop signaling impulses, a relay responsive to the signal impulses of said source, a pair of other relays normally controlled by the first-mentioned relay and controlled independently of said first relay while said first relay responds to the selecting impulses of a signal combination received from said source, another relay controlled by said first relay, a storing element, a source of potential for said element, said element arranged for control by said other relay and means controlled by the joint operation of said other relay and one of said pair of relays for indicating distortion present in the signal impulses received from said source.

7. A signal distortion indicator, according to claim 6, wherein said means comprises an electron discharge device and a regulating polarized impedance element for determining the amount of distortion.

8. A signal distortion indicator, according to claim 6, wherein said means comprises an electron discharge device, a polarized impedance element for controlling the operation of said device and a rotary stepping device controlled by said electron discharge device and arranged to regulate said impedance element in accordance with the amount of distortion present in the signal impulses received from said source.

RICHARD B. HEARN.